United States Patent [19]

Hehl

[11] 4,105,390
[45] Aug. 8, 1978

[54] DIE CLOSING UNIT WITH PLATE ADJUSTMENT MECHANISM FOR INJECTION MOLDING MACHINE

[76] Inventor: Karl Hehl, Arthur-Hehl-Strasse, 7291 Lossburg, Fed. Rep. of Germany

[21] Appl. No.: 799,578

[22] Filed: May 23, 1977

[30] Foreign Application Priority Data

May 25, 1976 [DE] Fed. Rep. of Germany ....... 2623392

[51] Int. Cl.² ............................................... B29C 1/16
[52] U.S. Cl. ................................................ 425/450.1
[58] Field of Search .................... 425/450.1, 451, 589, 425/593, 451.2, 451.3, 451.7

[56] References Cited

U.S. PATENT DOCUMENTS

| 3,093,863 | 6/1963 | Ehlert | 425/451.2 |
| 3,597,798 | 8/1971 | McDonald | 425/593 X |
| 3,756,757 | 9/1973 | Grundmann | 425/593 X |
| 3,951,579 | 4/1976 | Myers et al. | 425/450.1 X |

FOREIGN PATENT DOCUMENTS

| 2,306,826 | 4/1976 | France | 425/593 |
| 5,144,980 | 12/1976 | Japan | 425/589 |
| 488,507 | 5/1970 | Switzerland | 425/451 |

Primary Examiner—Richard B. Lazarus
Assistant Examiner—William R. Briggs
Attorney, Agent, or Firm—Joseph A. Geiger

[57] ABSTRACT

A die closing unit for an injection molding machine having either the stationary die carrier plate or the movable die carrier plate so connected to the tie rods, or to the piston rods, respectively, that the space between the two die carrier plates is adjustable, the adjustment mechanism including adjustment sleeves and rotationally coupled adjustment nuts seated on threaded tie rod portions, a clamping flange creating a rigid tie rod connection by abutting the sleeves and by clamping their threads, the sleeves having drive teeth for synchronous adjustment rotation after release by means of either an internally geared adjustment ring or a gear chain, with the aid of a drive arbor.

16 Claims, 8 Drawing Figures

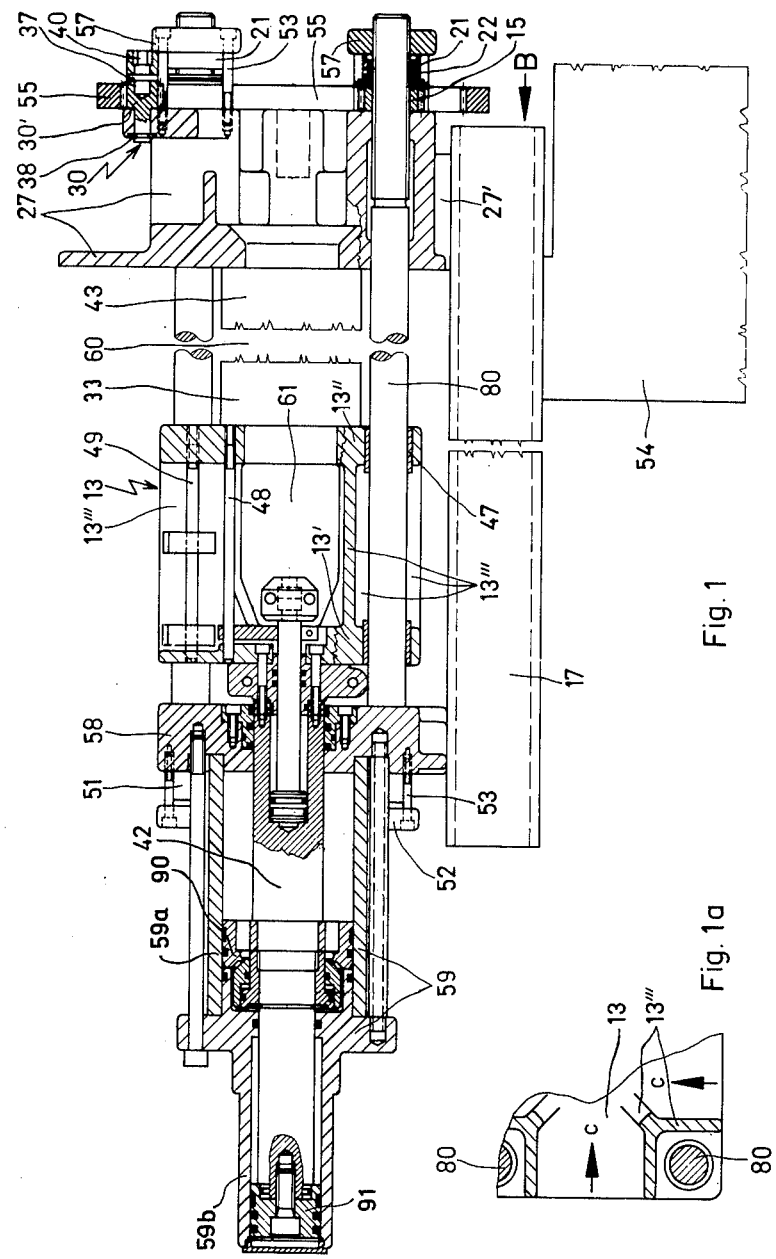

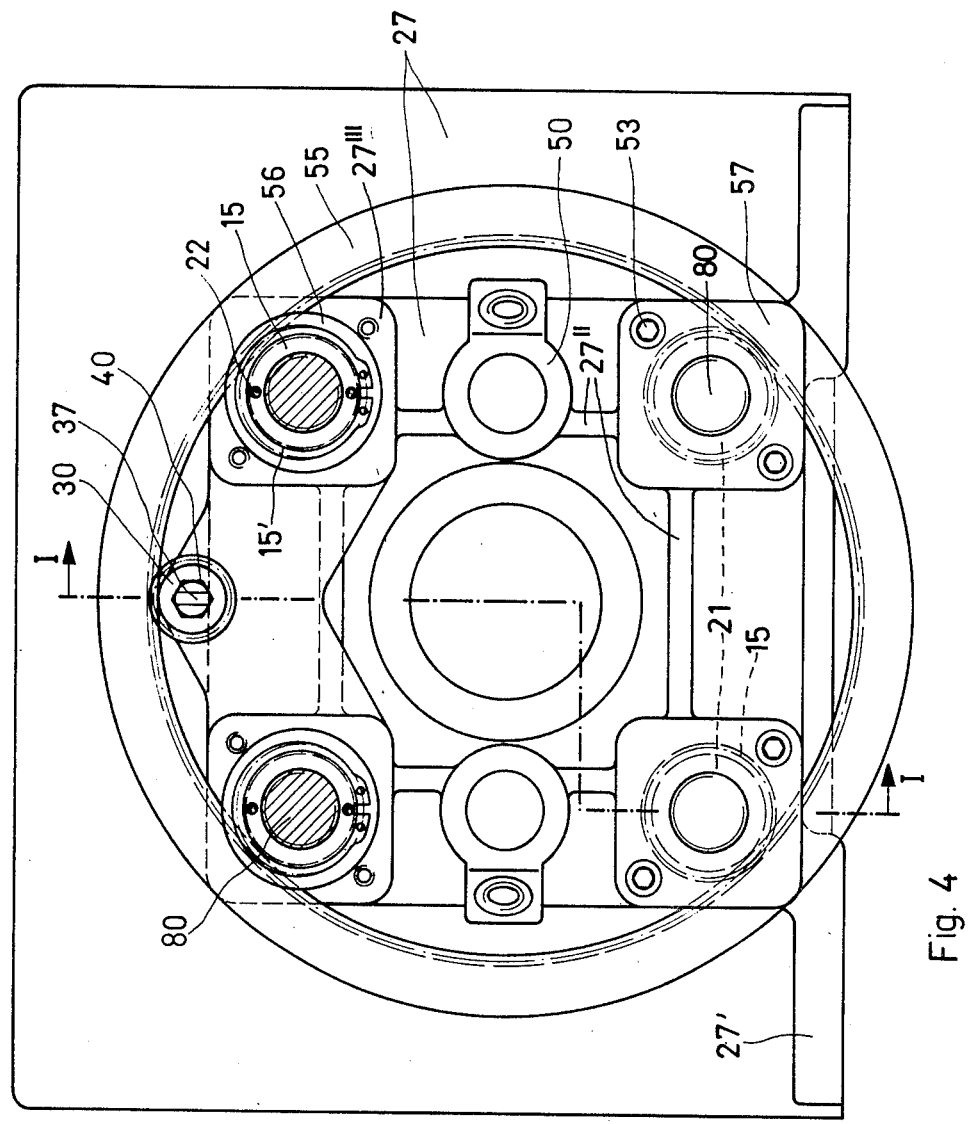

DIE CLOSING UNIT WITH PLATE ADJUSTMENT MECHANISM FOR INJECTION MOLDING MACHINE

BACKGROUND OF THE INVENTION

1. Field of the Invention

The present invention relates to injection molding machines, and, more particularly, to a die closing unit for an injection molding machine which has a built-in mechanism for the adjustment of the axial spacing between the die carrier plates, in adaptation to injection molding dies of different depths.

2. Description of the Prior Art

The die closing unit of a multi-purpose injection molding machine must be capable of accommodating a variety of different injection molding dies. Depending upon the construction of the die and on the axial depth of the die cavity, different dies require different opening and closing strokes.

In known injection molding machines, this requirement is being met by giving the hydraulic drive cylinder an axial displacement capability which, in the sense of an opening movement, is capable of accommodating a die of maximum depth and a maximum opening stroke, and which, in the sense of a closing movement, can also accommodate a very shallow die. It follows that, with a die of average depth and opening stroke, the displacement capability of the drive cylinder is not fully utilized, the cylinder stroke being foreshortened by means of adjustable limit switches or other electronic control elements. Such a die closing unit is disclosed, for example, in the British Pat. No. 1,105,183.

The primary disadvantage of this approach is that it requires a very long hydraulic drive cylinder, just for the sake of accommodating deep injection molding dies. On the other hand, even such an oversize drive cylinder may not have sufficient axial displacement capability to accommodate an injection molding die where core portions of one die half reach deep into the other die half, so that an extra long opening stroke is required to allow for the ejection of the finished part.

Additional design limitations with respect to the maximum axial displacement capability of the drive cylinder are present in the case of die closing units which utilize a tandem cylinder arrangement, with a valve-controlled main cylinder and a coaxially attached smaller auxiliary movement cylinder, as disclosed, for example, in U.S. Pat. No. 3,935,791, or in copending application Ser. No. 610,280, now U.S. Pat. No. 4,047,871. This type of hydraulic actuator utilizes a single piston rod which carries both the main piston and the auxiliary piston, the latter providing the opening and closing movement, while the main piston serves to apply an elevated pressure to the closed injection molding die.

As the aforementioned patents illustrate, the tandem cylinder arrangement may be used for both pull-type die closing units and push-type die closing units. In the former case, the die closing unit has two or four drive cylinders, and the piston rods extend all the way to the movable die carrier plate at the opposite end of the die closing unit, thereby taking the place of the tie rods. In the case of a push-type die closing unit, the hydraulic actuator is preferably a single axially extending cylinder actuator which is arranged axially behind the movable die carrier plate, the piston rod of the actuator being connected to its rear side. It follows that, if a way is found to reduce the required displacement capability of such a linear actuator unit, without restricting its capability of accommodating dies of different depths, such a reduction will reduce the size of the die closing unit in three ways: A reduction in the stroke of the hydraulic linear actuator shortens the required length of the main cylinder, it obviously similarly shortens the length of the auxiliary cylinder, and it produces a three-fold reduction in the length of the piston rod, or piston rods, respectively.

One such attempt at providing the desired versatility in a die closing unit, in terms of its compatibility with different injection molding dies, while minimizing the required displacement capability of the hydraulic drive cylinder, is disclosed in the German Offenlegungsschrift (Published Application) No. 21 02 722. The die closing unit which is disclosed in this publication features four threaded tie rods which are supported by the movable die carrier plate in an axially adjustable clamping engagement and which, in the closed position of the die closing unit, reach through, and a short distance beyond, the stationary die carrier plate, where they are engaged by a locking mechanism which is mounted on the outer side of the stationary die carrier plate. This locking mechanism, when actuated, also serves to clamp the injection molding die shut. The device suggests a push-type hydraulic linear actuator which is also adjustable in the longitudinal sense.

Among the shortcomings of this prior art suggestion are its complexity in terms of necessitating a locking mechanism for each tie rod, the inability of the device to reliably produce identical axial adjustments on all four tie rods, the need for the hydraulic actuator to serve as a guide for the movable die carrier plate, while the tie rods are retracted from the stationary die carrier plate, the need for the tie rods to move into and out of the stationary guide carrier plate during each closing stroke, and the need for the locking mechanism to be closed and opened against the tie rods during each injection molding cycle. This type of device, therefore, appears to be unsuitable for heavy-duty injection molding machines.

Other prior art devices feature adjustable tie rod clamping mechanisms which include a synchronization of the adjusting movements on the tie rods. Such a device is disclosed in U.S. Pat. No. 3,976,416, in connection with a knee-linkage-type die closing unit. This unit has two stationary tie rods in relation to which a stationary thrust plate is axially adjustable by means of synchronously rotatable threaded clamping members. The rotation of these clamping members is obtained with worm gear drives which are connected to a common crank. Another synchronized adjustment mechanism for a die closing unit is disclosed in the German Offenlegungsschrift (Published Application) No. 15 29 898. This die closing unit has four tie rods, and the threaded clamping members on the four tie rods have spur gear teeth on their periphery, meshing with a large central adjustment gear. The arrangement of pairs of clamping members on each tie rod, and their relative rotatability by means of a second central gear, provide for a backlash-free clamping of the threaded clamping members against each other.

SUMMARY OF THE INVENTION

Underlying the present invention is the primary objective of devising an improved die closing unit of the type described above, which offers an axial adjustability of the spacing between the stationary and movable die carrier plates, for the accommodation of injection molding dies of different depths, and which, by providing for synchronized adjustment motions on all tie rods, safely prevents adjustment errors.

The present invention proposes to attain this objective by suggesting a die closing unit in which a stationary die carrier plate and a movable die carrier plate face each other with their mounting faces, a piston rod, or rods, of a hydraulic linear actuator unit is attached to the movable die carrier plate, two or four parallel tie rods reach through both die carrier plates, and the clamping attachment between the tie rods and either a stationary plate or the movable die carrier plate is axially adjustable by means of synchronously rotatable threaded adjustment members which are seated on threaded portions of the tie rods, so as to engage the outer side of the adjustable plate. These adjustable tie rod connections include clamping means for axially preloading the tie rod connections in the same sense in which the tie rod connections are stressed, when the injection molding die is clamped shut by the power piston of the die closing unit.

In a preferred embodiment of the invention, the die closing unit is of the push-type, having four stationary tie rods extending between the cylinder mounting plate of a centrally located hydraulic linear actuator, a stationary die mounting frame at the opposite end of the unit serving as the stationary die carrier plate, and a movable die mounting frame, guided by the tie rods, serving as the movable die carrier plate. While one extremity of the four tie rods is fixedly attached to the cylinder mounting plate, the attachment of the tie rods to the stationary die mounting frame provides for axial adjustability. For this purpose, each tie rod has a threaded length portion on which is seated a threaded adjustment member which is normally clamped against the outer side of the die mounting frame by means of a suitable clamping flange.

The threaded adjustment member is preferably in the form of a nut which has two axially adjacent threaded portions which permit a small axial displacement of one portion relative to the other, so as to create a thread-clamping action, when the adjustment member is clamped against the die mounting frame. In a preferred embodiment, the adjustment member consists of two separate threaded parts which are rotatably coupled together, but axially independent of each other.

The preferred embodiment further suggests that the threaded adjustment members on the four tie rods have an outer periphery in the form of a spur gear or sprocket which is engaged by a common large adjustment gear or by an endless adjustment chain, so that the four adjustment members execute identical rotational adjusting movements.

In another preferred embodiment, the hydraulic linear actuator unit is of the pull-type, having four cylinders arranged in a common cylinder mount whose front face serves as the stationary die carrier plate, the piston rods of the four cylinders serving as movable tie rods whose distal extremities are rigidly connected to the movable die carrier plate on the other end of the die closing unit. The present invention provides for the connection between the piston rods and the movable die carrier plate to include axial adjustability of the same type as is provided on the stationary die mounting frame of the previously described push-type die closing unit.

The present invention further provides for the tie rods to be free of axial shoulders, so that, when a radially over-sized injection molding die is to be mounted or removed, the tie rods can be quickly disconnected and retracted out of the way of the injection molding die.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows:

FIG. 1 represents a first embodiment of the invention, as realized in connection with a push-type die closing unit, the latter being shown in an elevational longitudinal cross section, taken along line I—I of FIG. 4;

FIG. 1a shows a portion of the movable die carrier frame of the die closing unit of FIG. 1, in a transverse cross section;

FIG. 4 is an enlarged end view of the die closing unit of FIGS. 1–3, as seen in the direction of arrow B in FIG. 3;

DESCRIPTION OF THE PREFERRED EMBODIMENTS

Figure 5:
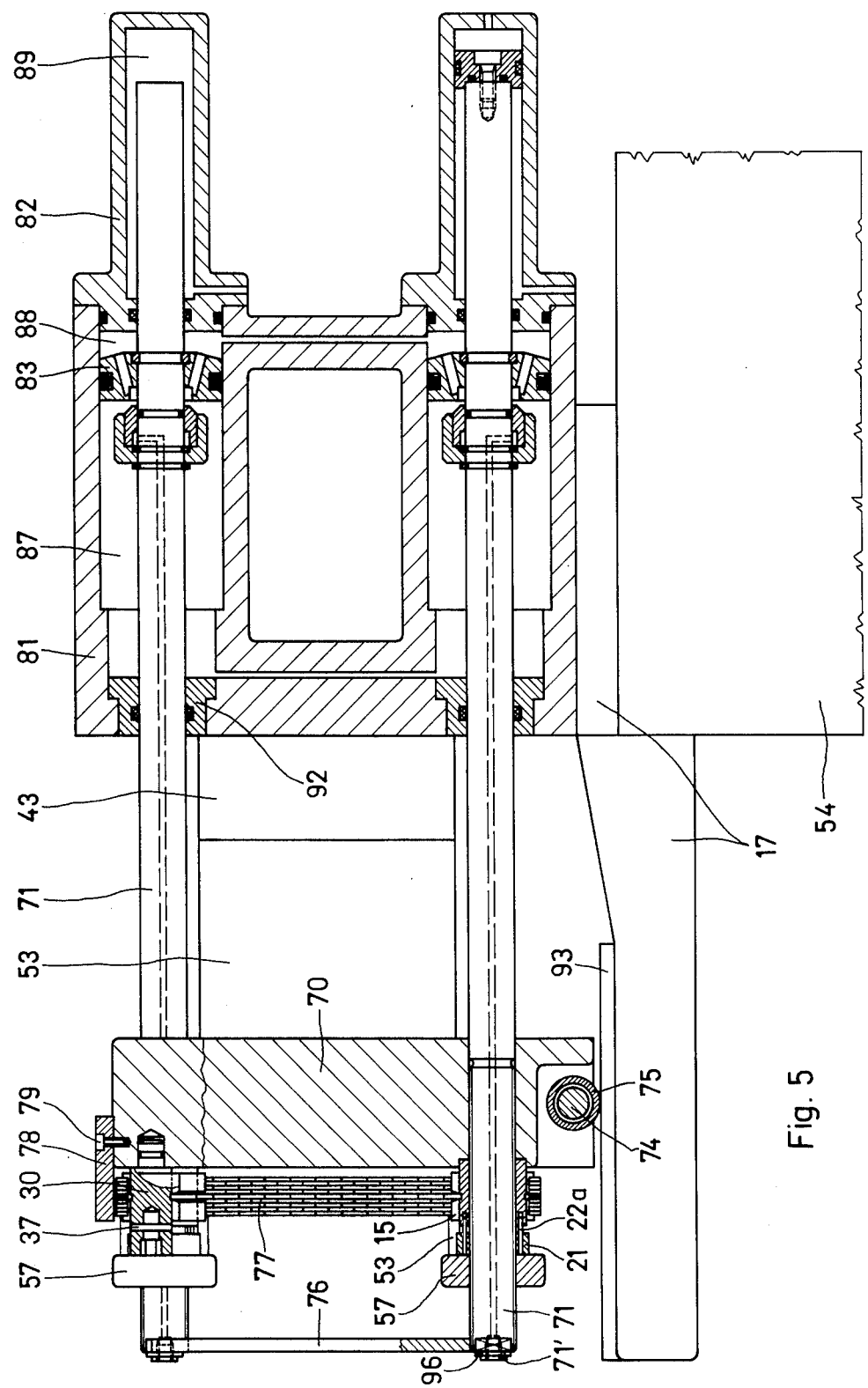
FIG. 5 represents a second embodiment of the present invention, in the form of a pull-type die closing unit, shown in a longitudinal cross section.
Figure 6:
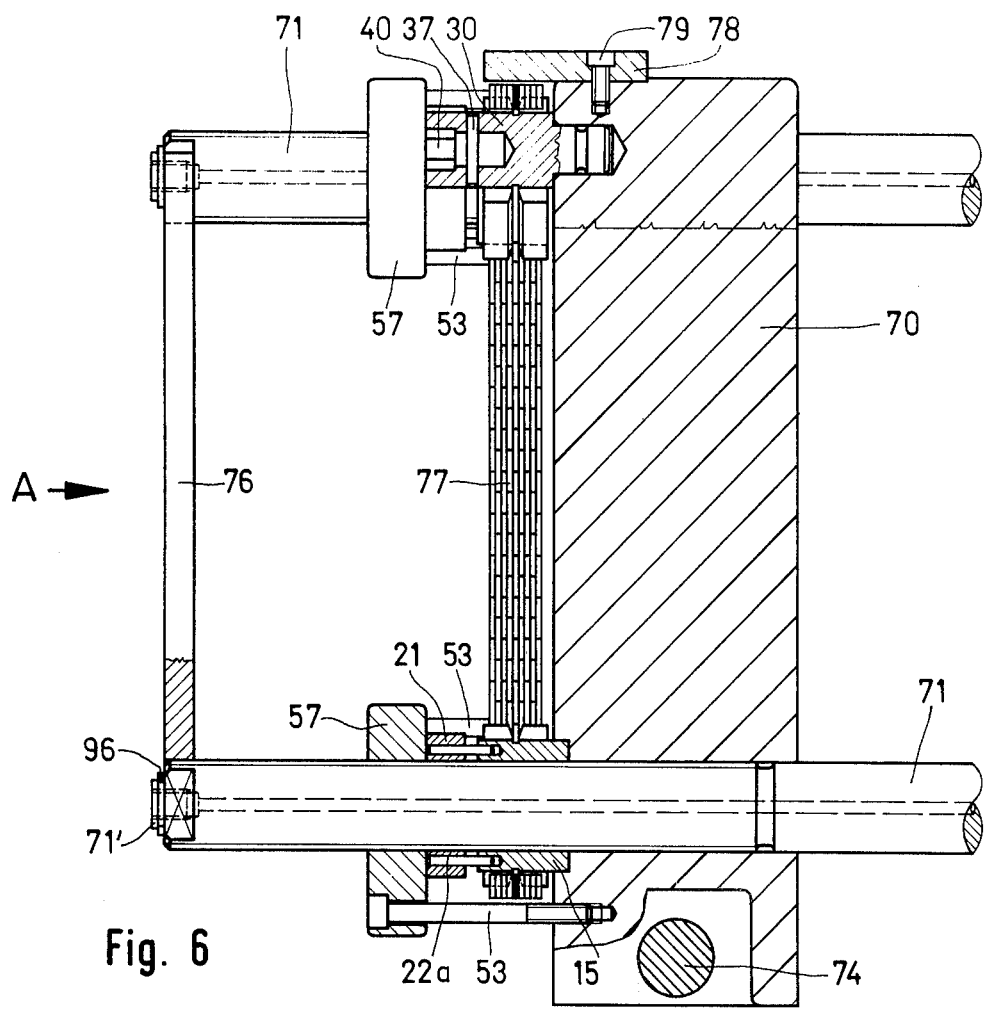
FIG. 6 shows, at an enlarged scale, a portion of the die closing unit of FIG. 5.
Figure 7:
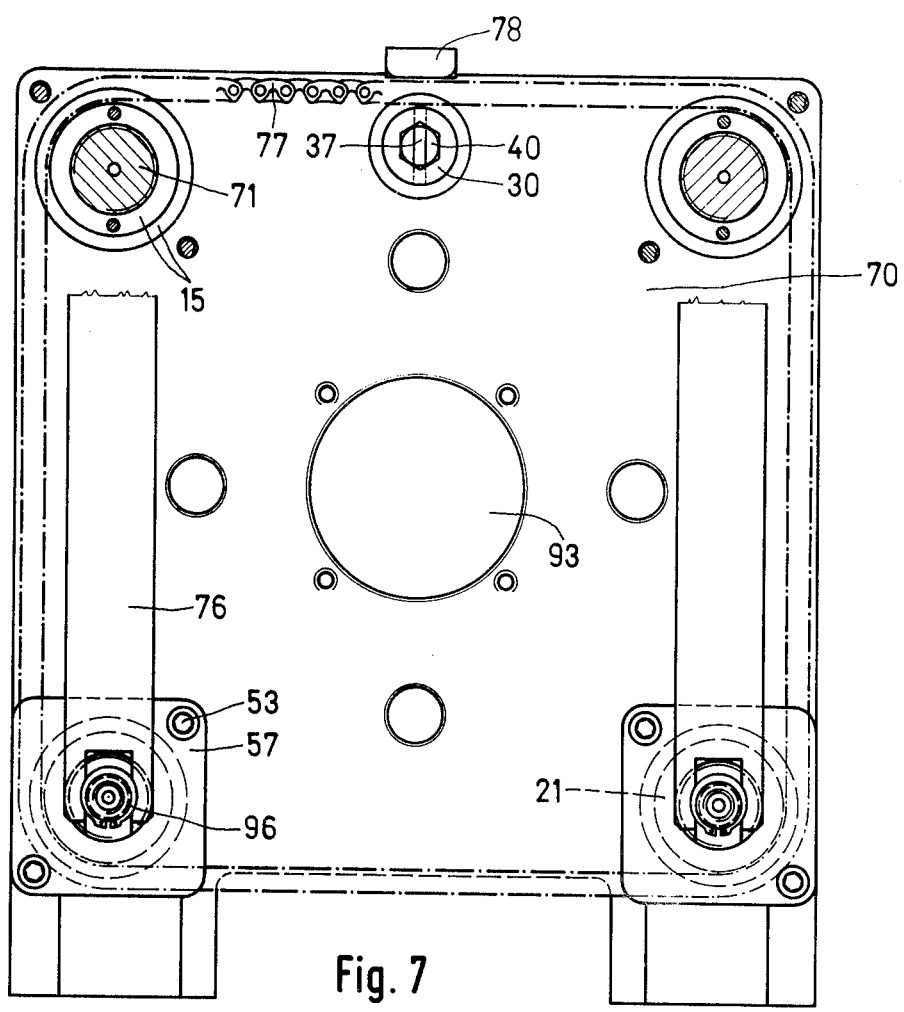
FIG. 7 shows the die closing unit of FIG. 5 in an end view, as seen in the direction of arrow A in FIG. 6.

The drawings illustrate two embodiments of the invention, as applied to a push-type die closing unit, shown in FIGS. 1–4, and to a pull-type die closing unit, shown in FIGS. 5–7. In both cases, the die closing unit is supported on a supporting frame 17 which partially overhangs the machine base 54 of the injection molding machine. The injection molding die is in each case shown as a two-plate die, the stationary die half 43 being supported on a stationary die carrier plate, and the movable die half 33 being supported on an axially movable die carrier plate. These die carrier plates will be described in more detail further below, in connection with the two embodiments.

The push-type die closing unit of FIGS. 1–4 features an axially oriented hydraulic linear actuator 59, consisting of a power cylinder 59a and a coaxially adjoining auxiliary cylinder 59b. A single piston rod 42 reaches through both cylinders, carrying a large valve piston 90 inside the power cylinder 59a and a much smaller auxiliary piston 91 inside the auxiliary cylinder 59b. The linear actuator assembly 59 is clamped to a heavy cylinder mounting plate 58 which, in turn, is bolted to the earlier-mentioned supporting frame 17.

The cylinder mounting plate 58 supports the near extremities of four parallel tie rods 80 which extend away from the linear actuator 59, the opposite extremities of the tie rods being supported in, and connected to, a stationary die mounting frame 27 which is likewise bolted to the supporting frame 17. The four tie rods thus form a rigid guide frame with the cylinder mounting plate 58 and the die mounting frame 27. The rigid connections at both ends of the tie rods will be described in detail further below.

The four tie rods support a box-shaped movable die mounting frame 13 which is connected to the forward extremity of the piston rod 42 of the linear actuator 59. This die mounting frame is preferably a unitary casting, having a pressure transfer wall 13' on its rear side and a die mounting wall 13" on its forward side, the two axially spaced walls being connected by cross-sectionally L-shaped pressure transfer ribs 13'''. As can be seen in FIG. 1a, the latter are so arranged that they leave access openings C to the hollow interior of the movable die mounting frame 13, where an auxiliary device, such as an ejector or unscrewing device, for example, may be mounted. A number of clamping bolts connect the piston rod 42 to the pressure transfer wall 13'. Suitable guide bushings 47 in the latter and in the die mounting wall 13" assure a cant-free precision guidance of the movable die mounting frame 13 on the tie rods 80. The axial spacing between the bushings 47 is approximately identical to the transverse spacing between the tie rods 80.

Figure 2:
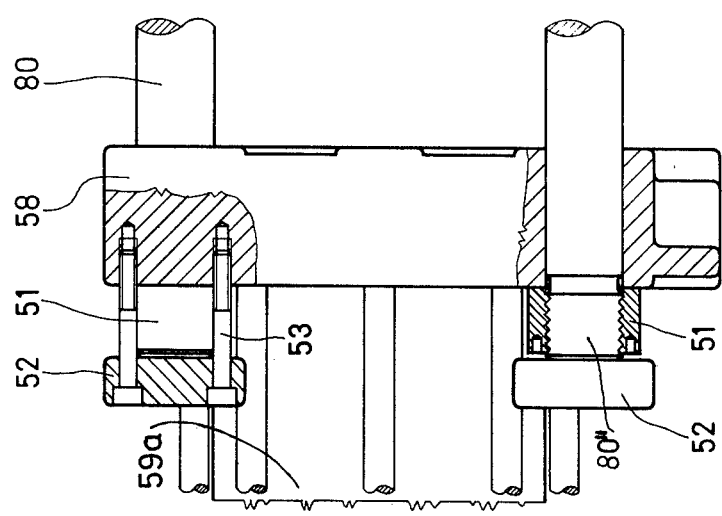
FIG. 2 shows, at an enlarged scale, the tie rod connection at the cylinder mounting plate.

As can be seen in FIG. 2, the near extremities of the tie rods 80 are seated inside bores of the cylinder mounting plate 58 with a diameter which is equal to the guide diameter of the rods. Each tie rod has a threaded end portion 80" protruding to the rear of the plate 58 and carrying a positioning nut 51. A clamping cap 52, engaged by clamping bolts 53 which reach into the cylinder mounting plate 58, bears against the end face of the tie rod 80, thereby creating a clamping preload between the plate 58 and the positioning nut 51 in the same sense in which the die closing pressure is transferred from the hydraulic linear actuator 59 to the tie rods 80. This tie rod connection allows for easy retraction of the tie rods 80, following removal of the clamping caps 52 and of the positioning nuts 51, if an oversize die closing unit is to be mounted in the die closing unit.

Figure 3:
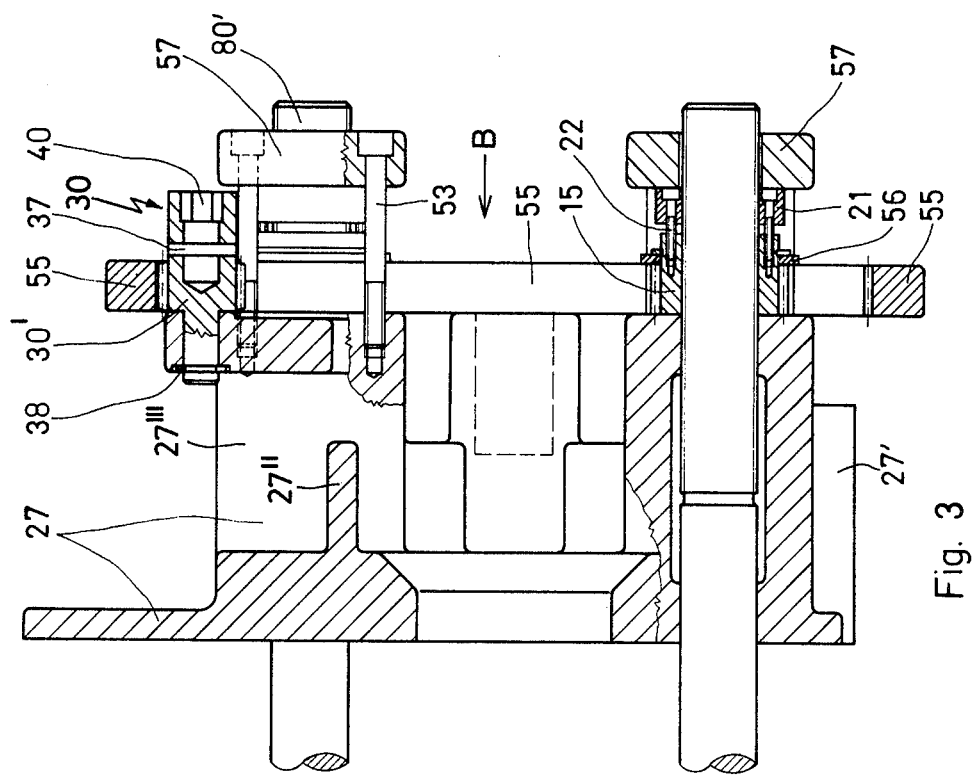
FIG. 3 shows, at a similarly enlarged scale, the adjustable tie rod connection at the stationary die mounting frame.

The distal extremities of the four tie rods 80 are similarly clamped against the outer side of the stationary die mounting frame 27, shown at an enlarged scale in FIG. 3, except that in this case, the tie rod connections include a mechanism which allows for the axial adjustment of the stationary die mounting frame 27. For this purpose, the frame 27 has four axial extensions 27'''' on the rear side of its die mounting wall, the extensions 27'''' having seating bores for the rear end portions of the tie rods 80. Four ribs 27" form stiffening connections between the extensions 27'''' and two mounting sockets 50 (FIG. 4) for an injection unit (not shown).

Each tie rod 80 has a threaded rear portion 80' on which is rotatably seated a threaded adjustment sleeve 15 which bears axially against the rear side of the associated frame extension 27''''. Behind the adjustment sleeve 15 is arranged a clamping nut 21 which likewise engages the threads of the tie rod portion 80' and which is rotatably coupled to the adjustment sleeve 15 by means of a number of clamping bolts 22. The heads of the latter are axially countersunk into the clamping nuts 21 and are normally mounted in such a way that they do not exert a clamping action between the adjustment sleeve 15 and the clamping nut 21, in order to permit a small relative axial displacement therebetween.

A clamping flange 57, arranged axially behind the clamping nut 21, engages the latter, when two clamping bolts 53 which reach from the flange 57 into the frame extension 27'''', are tightened, with the result that a twofold clamping action is created: the mating threads of the clamping nut 21, adjustment sleeve 15, and tie rod portion 80' are clamped together, while the forward end face of the adjustment sleeve 15 is clamped against the rear side of the frame extension 27''''. This twofold clamping action assures a preloaded, backlash-free rigid connection between the tie rods 80 and the stationary die mounting frame 27 in all adjustment positions.

In order to obtain precise synchronism in the adjustment rotations of the four threaded adjustment sleeves 15, the latter are provided with gear teeth on their peripheries, so as to act as spur gears in cooperation with an internally geared adjustment ring 55 whose diameter is such that it simultaneously meshes with the teeth of all four adjustment sleeves 15. This arrangement can be seen in FIG. 4. The adjustment ring 55 is axially retained by means of retaining rings 56 which are seated on the adjustment sleeves 15.

To rotate the large adjustment ring 55, the adjustment mechanism further includes a drive arbor 30. The latter is journalled inside a transverse bridge portion of the die mounting frame 27, having a gear portion 30' engaging the teeth of the adjustment ring 55 and a hollow extension 40 adapted for the insertion of a suitable cranking device. The latter may have matching hexagonal drive faces and/or a slot cooperating with a transverse pin 37 in the arbor 30. A retaining ring 38 secures the arbor 30 in its journal bore.

A position adjustment of the stationary die mounting frame 27 is performed in the following manner: The bolts which clamp the base 27' of the die mounting frame 27 to the supporting frame 17 are loosened; the frame 27 can now slide longitudinally on the supporting frame 17, being guided by the latter. But, before such a movement can take place, it is necessary to unclamp the four adjustment sleeves 15 and clamping nuts 21 by loosening the bolts 53 of the clamping flanges 57 to a point where the clamping action between the cooperating threaded parts is sufficiently released to permit rotation. Now, the drive arbor 30 is rotated with the aid of a suitable cranking tool, its rotation being transmitted by the adjustment ring 55 to all four adjustment sleeves 15, which execute a corresponding axial displacement on the four tie rods 80, displacing the stationary die mounting frame 27 with them.

Once the desired new position is reached, the adjustment mechanism is again blocked by tightening the bolts 53 and by clamping the frame 27 to the supporting frame 17. It should be understood that, while it is preferable, in most cases, to arrange for the stationary die mounting frame 27 to be displaceable longitudinally on the supporting frame 17, such displaceability could also be provided for the cylinder mounting plate 58. In this case, an adjustment rotation of the sleeves 15 on the tie rods 80 would mean that the tie rods are drawn to the rear, thereby displacing the entire die closing unit, with the exception of the stationary die mounting frame 27, accordingly. On the other hand, it is also possible to apply the present invention in such a way that the near extremities of the tie rods are associated with an adjustment mechanism, or that such a mechanism is arranged on both tie rod extremities.

The novel tie rod connection and adjustment mechanism of the invention also make it possible to utilize radially over-sized injection molding dies, in which case it is necessary to remove at least one tie rod for the insertion and removal of the die halves. This can be accomplished by releasing the tie rod connection, or connections, at the cylinder mounting plate 58, in the manner described further above. But, before this is done, it will be necessary to secure the rotational position of the adjustment sleeve 15 and clamping nut 21 on the tie rods involved. For this purpose, the clamping flange 57 is removed and the bolts 22 are tightened into clamping engagement between the threads of the adjustment sleeve 15, clamping nut 22, and threaded tie rod portion 80'. Now, the tie rod can be retracted rearwardly, out of the way of the die halves. This feature allows for the use of injection molding dies which could not otherwise be inserted between the tie rods, or of injection molding dies which reach radially beyond the tie rods, having appropriate bores or recesses to accommodate the latter.

The second embodiment of the invention, in the form of a pull-type die closing unit shown in FIGS. 5–7, features a hydraulic linear actuator unit with four linear actuators 87 which are arranged in a common cylinder mount 81. As in the case of the previously described single linear actuator, the four actuators of this embodiment have each a single piston rod 71 which carries a valve piston 83 inside a power cylinder 88, the piston rod itself, or a smaller piston on the end of the piston rod, cooperating with a smaller auxiliary cylinder 82. The auxiliary cylinders of the actuator unit shown in FIG. 5, rather than being of the double-acting type, use two different piston arrangements in different cylinders, the auxiliary cylinder without auxiliary piston producing a rapid closing motion, while the auxiliary cylinder with auxiliary piston on the piston rod produces a rapid opening motion. Diagonally opposite auxiliary cylinders perform the same function.

The forwardly oriented face of the cylinder mount 81 serves as the stationary die carrier member, the cooperating movable die carrier member being in the form of a die mounting plate 70 which is attached to the forward end portions of the piston rods 71. The weight of the movable die mounting plate 70 is carried by the supporting frame 17 with the aid of suitable guide rollers 75 which are mounted on a shaft 74 and engage a guide profile 93 of frame 17. This way, the weight of the moving parts, which would otherwise have to be supported by the cylinder end flanges 92, is neutralized.

The piston rods 71 of this embodiment serve essentially the same function as the tie rods 80 of the previously described embodiment, and the reference to tie rods throughout this specification and the appended claims should be understood to include the piston rods of a pull-type embodiment, where the piston rods are, in fact, longitudinally moving tie rods.

The connection between the piston rods 71 and the movable die mounting plate 70 includes an adjustment mechanism which is very similar to the adjustment mechanism which has been described further above, in connection with the pushtype die closing unit of FIGS. 1–4. In fact, the two adjustment mechanisms could be exactly identical, but FIG. 5 shows a way of synchronizing the rotation of the threaded adjustment sleeves 15 which requires less space. For this purpose, the internally geared adjustment ring 55 of the earlier embodiment has been replaced with an endless gear chain 77 which engages the teeth of the four adjustment sleeves 15.

The threaded clamping nuts 21 are again rotationally coupled to the adjustment sleeves 15, but axially independent therefrom, so that a thread-clamping action is obtained, when the clamping flanges 57 are axially pulled against the clamping nuts 21 by tightening the bolts 53. The previous axial clamping bolts 22 of the earlier embodiment are here replaced by simple pins 22a, because the separate sleeve-clamping action of the bolts 22, for the retraction of the tie rod, is not needed in this case, the piston rods being retractable from the movable die mounting plate 70 only after removal of their connecting members and of the adjustment mechanism.

The rotational movement of the endless gear chain 77 is obtained in a manner similar to that described earlier, a drive arbor 30 being journalled in the die mounting plate 70. A retaining bracket 78, held in place by means of screws 79, prevents the gear chain 77 from jumping the teeth of the drive arbor 30. From a comparison between the adjustment mechanisms of the two embodiments described hereinabove, it will become clear that the gear chain 77 could also be used in the embodiment of FIG. 1, in the place of the internally geared adjustment ring 55.

The extremities of the piston rods 71 are interconnected in pairs by means of transverse connecting members 76 which engage flattened portions of the piston rod extremities, in order to prevent the rotation of these rods during position adjustments. Retaining rings 96 hold the connecting members 76 in place. The operation of the adjustment mechanism of this embodiment is identical to that of the previously described embodiment, except for the absence of the need for the die mounting frame 70 to be clamped to the supporting frame 17 before and after the adjustment operation.

It should be understood, of course, that the foregoing disclosure describes only preferred embodiments of the invention and that it is intended to cover all changes and modifications of these examples of the invention which fall within the scope of the appended claims.

I claim the following:

1. An adjustable die closing unit for an injection molding machine comprising in combination:

a stationary die carrier member having a die mounting face for the attachment thereto of a die plate of an injection molding die;

a plurality of parallel, transversely spaced tie rods rigidly connected to the stationary die carrier member and extending perpendicularly away from its die mounting face;

a hydraulic linear actuator having a cylinder with a stationary member which is rigidly connected to the tie rods, at a longitudinal distance from the stationary die carrier member, and a piston with a piston rod extending parallel to, and centrally between the tie rods, in the direction of the stationary die carrier member;

a movable die carrier member arranged between the stationary die carrier member and the hydraulic linear actuator and having a die mounting face oriented towards the die mounting face of the stationary die carrier member, for the attachment thereto of another die plate of the injection molding die; the movable die carrier member being guided by the tie rods and connected to the piston rod of the linear actuator, to be moved by the latter towards and away from the stationary die carrier member, thereby closing and opening the injection molding die; and a position adjustment mechanism associated with the tie rods and with one of the two stationary members to which the tie rods are rigidly connected, the position adjustment mechanism including:

tie rod positioning bores in said associated member, the bores extending from its mounting face to an abutment face on the opposite side of the member;

a threaded length portion of each tie rod protruding beyond said abutment face;

threaded adjustment members seated on the protruding threaded tie rod portions and abutting against said abutment face, each adjustment member having two threaded member portions which are rotatably united, but axially displaceable relative to one another, for a thread-clamping action under an axial load;

means synchronously rotating all the adjustment members on their tie rods; and means axially clamping the adjustment members against said abutment face, thereby blocking them against rotation, while also creating said thread-clamping action.

2. A die closing unit as defined in claim 1, wherein the rigid connection between the tie rods and the one of the two stationary members which is not associated with the position adjustment mechanism includes:

tie rod positioning bores in said member, the bores extending from its mounting face to an abutment face on the opposite side of the member;

a threaded length portion of each tie rod protruding beyond said abutment face;

threaded positioning members seated on the protruding threaded tie rod portions; and means axially clamping the tie rods into a rigid connection with said stationary member by axially preloading the protruding tie rod portions towards said stationary member, so as to clamp their positioning members against its abutment face.

3. A die closing unit as defined in claim 2, wherein the tie rods have the same outer diameter on their threaded length portions as on their length portion therebetween;

the tie rod positioning bores in the stationary die carrier member and those in the stationary mounting member of the hydraulic linear actuator also have the same diameter so that at least one of the tie rods is longitudinally retractable out of the range of the injection molding die, after its rigid connection has been released.

4. A die closing unit as defined in claim 3, wherein each adjustment member includes an adjustment sleeve and an axially adjacent thread-clamping nut which, together, constitute its two threaded member portions, and at least one axially extending coupling element which rotationally connects the sleeve to the unit, while allowing for relative axial displacement therebetween.

5. A die closing unit as defined in claim 4, wherein the axially extending coupling elements are clamping bolts which, when tightened, create a thread-clamping action in the adjustment member, independently of the action of the adjustment member clamping means, thereby making it possible to secure a given position of the adjustment member on its tie rod, while the adjustment member clamping means is being removed and the tie rod is being retracted for access to the injection molding die.

6. A die closing unit as defined in claim 1, wherein the die closing unit has four tie rods whose centers coincide with the four corners of a rectangle;

the four tie rods carry four threaded adjustment members as part of said position adjustment mechanism, the adjustment members having drive teeth on their peripheries; and the rotating means of the position adjustment mechanism includes a toothed rotating member which simultaneously engages the teeth of all four adjustment members.

7. A die closing unit as defined in claim 6, wherein the toothed rotating member is an internally geared adjustment ring which surrounds the four adjustment members and engages their teeth.

8. A die closing unit as defined in claim 6, wherein the toothed rotating member is an endless chain engaging the teeth of the four adjustment members.

9. A die closing unit as defined in claim 6, wherein the rotating means of the position adjustment mechanism further includes a drive arbor which is journalled in the associated stationary member and which has a drive teeth which are likewise engaged by the toothed rotating member.

10. A die closing unit as defined in claim 1, wherein the adjustment member clamping means includes a non-rotatable clamping member in axial contact with the adjustment members and threaded fasteners engaging the clamping member and the associated stationary member, so as to pull them together.

11. A die closing unit as defined in claim 1, wherein the position adjustment mechanism is associated with the stationary die carrier member;

the adjustment member clamping means includes, for each tie rod, a clamping flange in axial contact with the adjustment member, and clamping bolts pulling said flange towards the stationary die carrier member;

at least one of the tie rods which are rigidly connected to the stationary mounting member of the linear actuator is releasable, to permit the retraction of said tie rod through the positioning bore of the stationary die carrier member, after its clamping flange has been removed.

12. An adjustable die closing unit for an injection molding machine comprising in combination:

a stationary die carrier member having a die mounting face for the attachment thereto of a die plate of an injection molding die;

a hydraulic linear actuator unit having at least two transversely spaced parallel cylinders which are rigidly connected with the stationary die carrier member, and cooperating pistons with piston rods which extend longitudinally forwardly from said die mounting face;

a movable die carrier member arranged at a distance from the stationary die carrier member and having a die mounting face oriented rearwardly towards the die mounting face of the stationary die carrier member, for the attachment thereto of another die plate of the injection molding die, the movable die carrier member being rigidly connected to the piston rods of the hydraulic linear actuator unit, to be moved by the latter towards and away from the stationary die carrier member, thereby closing and opening the injection molding die; and a position adjustment mechanism associated with the movable die carrier member, where the piston rods are rigidly connected to it, the position adjusting mechanism including;

piston rod positioning bores in the movable die carrier member, the bores extending from its mounting face to an abutment face on the opposite side of the member;

a threaded length portion of each piston rod protruding beyond said abutment face;

threaded abutment members seated on the protruding threaded piston rod portions and abutting against said abutment face, each adjustment member having two threaded member portions which are rotatably united, but axially displaceable relative to one another, for a thread-clamping action under an axial load;

means synchronously rotating all the adjustment members on their piston rods; and means axially clamping the adjustment members against said abutment face, thereby blocking them against rotation, while also creating said thread-clamping action.

13. A die closing unit as defined in claim 12, wherein each adjustment member includes an adjustment sleeve and an axially adjacent thread-clamping nut which, together, constitute its two threaded member portions, and at least one axially extending coupling element which rotationally connects the sleeve to the unit, while allowing for relative axial displacement therebetween.

14. A die closing unit as defined in claim 12, wherein the hydraulic linear actuator unit has four parallel cylinders with four pistons and piston rods whose centers coincide with the four corners of a rectangle;

the four piston rods carry four threaded adjustment members as part of said position adjustment mechanism, the adjustment members having drive teeth on their peripheries; and the rotating means of the position adjustment mechanism includes a toothed rotating member which simultaneously engages the teeth of all four adjustment members.

15. A die closing unit as defined in claim 14, wherein the toothed rotating member is an endless chain engaging the teeth of the four adjustment members; and the rotating means of the position adjustment mechanism further includes a drive arbor which is journalled in the movable die carrier member and which has drive teeth which are likewise engaged by the endless chain.

16. A die closing unit as defined in claim 12, wherein the adjustment member clamping means includes a nonrotatable clamping member in axial contact with the adjustment members, and threaded fasteners engaging the clamping member and the associated stationary member, so as to pull them together.

* * * * *